– 274/86  OR  4,568,140

United States Patent [19]
van der Werf et al.

[11] Patent Number: 4,568,140
[45] Date of Patent: Feb. 4, 1986

[54] OPTICAL ELEMENT COMPRISING A TRANSPARENT SUBSTRATE AND AN ANTIREFLECTION COATING FOR THE NEAR-INFRARED REGION OF WAVELENGTHS

[75] Inventors: Pieter van der Werf; Jan Haisma, both of Eindhoven, Netherlands

[73] Assignee: U.S. Philips Corporation, New York, N.Y.

[21] Appl. No.: 531,115

[22] Filed: Sep. 12, 1983

[30] Foreign Application Priority Data

May 24, 1983 [NL] Netherlands ............ 8301824

[51] Int. Cl.⁴ .................... G02B 1/10; G02B 5/28
[52] U.S. Cl. ................... 350/1.6; 350/165; 350/166
[58] Field of Search ............ 350/1.6, 1.7, 164, 165, 350/166

[56] References Cited

U.S. PATENT DOCUMENTS 3,804,491  4/1974  Morokuma et al. ............ 350/164

FOREIGN PATENT DOCUMENTS 1380793  1/1975  United Kingdom.
1406567  9/1975  United Kingdom.

OTHER PUBLICATIONS

Cox et al., *Infrared Filters of Antireflected Si, Ge, InAs, and InSb*, JOSA, Jul. 1961, vol. 51, pp. 714–718.

Primary Examiner—John K. Corbin
Assistant Examiner—Bruce S. Shapiro
Attorney, Agent, or Firm—Marc D. Schechter

[57] ABSTRACT

An optical element comprises a transparent substrate. An antireflection coating is provided on the substrate for reducing reflections of wavelengths from approximately 700 nm to approximately 1700 nm. The coating comprises a plurality of stacked, uniform layers with refractive indices which decrease toward the top of the stack. A base coating is arranged between the layer stack and the substrate. The effective refractive index at the top of the base coating is at least 2.5, and the base coating is a graded index layer.

16 Claims, 6 Drawing Figures

OPTICAL ELEMENT COMPRISING A TRANSPARENT SUBSTRATE AND AN ANTIREFLECTION COATING FOR THE NEAR-INFRARED REGION OF WAVELENGTHS

BACKGROUND OF THE INVENTION

The invention relates to an optical element comprising a transparent substrate provided with an antireflection coating for the range of wavelengths from approximately 700 nm to approximately 1700 nm. The coating comprises a top coating and a base coating. The top coating has a plurality of uniform layers whose refractive indices decrease toward the top of the coating.

The optical element may be an element of an optical fiber telecommunication system. It may be, for example, a lens or the end face of a fiber. In this respect, fiber is to be understood to mean a light-conducting fiber with a cladding. The optical element may also be an element of an infrared scanning system for medical or military use.

British Pat. No. 1,380,793 describes an antireflection coating which is suitable for visible wavelengths, i.e. for the range from approximately 400 nm to approximately 800 nm. This coating comprises five superimposed homogeneous layers having different refractive indices. Each layer has an optical thickness equal to $\lambda_o/4$, $\lambda_o$ being a reference wavelength. The first layer on the substrate has a refractive index which is greater than that of the substrate. The second layer deposited on this first layer has a refractive index which is greater than that of the first layer. These two layers form the base coating. The next three layers form the top coating and have refractive indices which decrease toward the top of the coating.

In optical fiber-based telecommunication systems, it is necessary to eliminate reflections over a wide range of wavelengths from approximately 800 nm to approximately 1650 nm. This is because in optical telecommunication systems two basic types of light sources are used: diode lasers of the GaAs-type, which emit wavelengths in the range from approximately 800 nm to approximately 900 nm, and diode lasers of the InP-type, which emit wavelengths in the range between approximately 1100 nm and approximately 1650 nm. The reflection coefficients of the elements in optical telecommunication system should preferably be 0.5% or less.

SUMMARY OF THE INVENTION

It is an object of the present invention to provide an antireflection coating which is suitable for at least the range of wavelengths from 800 nm to 1650 nm and which has a reflection coefficient of 0.5% or less. The antireflection coating is based on the idea that a substrate whose reflection is to be reduced and which has a refractive index of an arbitrary value between, for example, 1.45 and for example 2.0; can first be coated with a base coating. The refractive index of the substrate-base coating assembly is chosen to ease selection of an antireflection top coating.

According to the invention the effective refractive index at the top of the base coating is at least 2.5. This base coating comprises a graded index layer whose refractive index at the location of the substrate is equal to that of the substrate.

The effective refractive index at the top of the base coating is defined as the refractive index of the assembly comprising the substrate and the base coating.

A graded index layer is defined as a layer of an inhomogeneous material whose refractive index varies gradually from a specific value, in the present case the substrate refractive index, to a higher or a lower value. Such a layer can be obtained, for example, by the simultaneous vacuum deposition of two materials having a higher and a lower refractive indices respectively. By continuously changing the mixing ratio of the two materials, the refractive index is continuously changed.

The invention is based on the recognition of the fact that, as the effective refractive index at the top of the base coating increases, the reflection coefficient of the entire coating can be reduced and the range of wavelengths for which the reflection coefficient is low can be extended. Also, for the infrared region from 700 nm to 1700 nm, vacuum deposition materials are available with substantially higher refractive indices than those of the materials available for the range of visible light.

There are two main embodiments of the invention. In the first main embodiment, the base coating comprises a single layer. The base coating layer has a continuously varying refractive index which is at least 2.5 at the top of the layer. The top coating comprises three homogeneous layers which each have an optical thickness equal to $\lambda_o/4$, $\lambda_o$ being a reference wavelength.

The reference wavelength is the wavelength which is representative of the relevant region. For the coatings described here, the reference wavelength is 1000 nm.

It is to be noted that in U.S. Pat. No. 3,804,491 (Morokuma et al), an antireflection coating is described which comprises a layer deposited on the substrate. This layer has a reflective index which gradually increases in the direction of the top of the layer from a value equal to that of the substrate. However, this coating is intended for the visible range of wavelengths and not for the near infrared region. Moreover, according to this Patent, the refractive indices of the layers should preferably be smaller than 2. On the layer with an increasing refractive index, two layers are deposited, one having an optical thickness of $\lambda_o/4$ and the other having an optical thickness of $\lambda_o/2$. In contrast, in the the antireflection coating according to the invention, three layers of different refractive indices are deposited on the graded-index layer. Each of the three layers has an optical thickness equal to $\lambda_o/4$.

In a preferred version of this embodiment of the invention, the effective refractive index at the top of the graded index layer is at least 3.5. This layer comprises one of the following mixtures:
Si and $Si_3N_4$.
Si, $Si_3N_4$ and $SiO_2$.
GaP and GaN.
GaP, GaN and $Ga_2O_3$.
PbS and ZnS. PbS, ZnS and a B-Na-Al-K glass.

In a second embodiment of the antireflection coating according to the invention, the base coating comprises a first, inhomogeneous, layer whose refractive index decreases toward the top of the coating to a value lower than that of the substrate refractive index and at least two homogeneous layers, whose refractive indices increases toward the top of the coating. The top coating comprises three layers which each have an optical thickness equal to $\lambda_o/4$, $\lambda_o$ being the reference wavelength.

The effect of the second and the third layers is that the effective refractive index at the top of the base coating is at least 2.5.

It is to be noted that United Kingdom Pat. No. 1,406,578 (equivalent to German patent application No. 2,341,359 describes an antireflection coating which comprises three groups of layers. Starting from the substrate, the layers of the first group have a decreasing refractive index, the layers of the second group have an increasing refractive index, and the layers of the third group have a decreasing refractive index. However, this antireflection coating is intended for the visible range of wavelengths, and none of the layers has a refractive index higher than 2. Moreover, this coating does not comprise a graded index layer.

DESCRIPTION OF THE PREFERRED EMBODIMENTS

For a correct understanding of the invention, the principal points are described of a newly developed theory for antireflection coatings. This theory utilizes the insight that the laborious task of determining a suitable antireflection coating for each type of glass can be simplified substantially if, for a specific substrate, the refractive index is given one of a number of values for which antireflection coatings are available.

Figure 1:
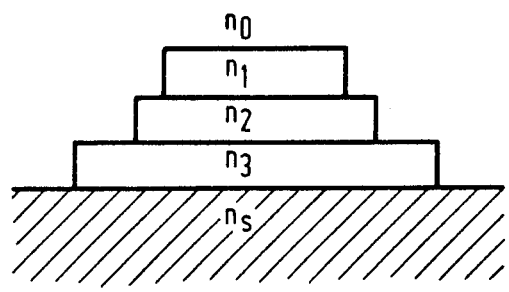
FIG. 1 schematically shows an optical element with a three-layer coating.

It is assumed that a three layer antireflection coating is used. All the layers of the antireflection coating have an optical thickness of a quarter of the reference wavelength. From the article by J. T. Cox, et al entitled "Infrared Filters of Antireflected Si, Ge, InAs and InSb" (*Journal of the Optical Society of America*, Vol. 51, No. 7, July 1961, pages 714–718), it is known that for such a coating the reflection becomes zero if $$n_1 \times n_3 = n_2^2 \tag{1}$$

and $$n_2^2 = n_0 \times n_s \tag{2}$$

at a specified wavelength. As indicated in FIG. 1 herein, $n_1$, $n_2$, $n_3$, $n_s$, and $n_0$ are the refractive indices of the top, middle and bottom layers, the substrate, and the surrounding medium, respectively. The surrounding medium will generally be air with $n_0 = 1$.

It follows from equations (1) and (2) that:

$$n_1 \times n_3 = n_2 \times \sqrt{n_0 \times n_s} \tag{3}$$

For the specified values of $n_s$ $n_1$, $n_3$ may be varied in steps, each value of $n_3$ corresponding to a specific value of $n_2$.

As in known, the reflection minimum is flanked with secondary minima. By varing the absolute value of $n_3$ and the corresponding value of $n_2$ the secondary minima can be shifted toward the central zero-minimum, and the value of these secondary minima can be reduced so that a low reflection over a comparatively wide range of wavelengths is obtained. The corresponding values of $n_2$ and $n_3$ may be designated $n_{2,m}$ and $n_{3,m}$, so that:

$$n_1 \times n_{3,m} = n_{2,m} \times \sqrt{n_0 \times n_s} \tag{4}$$

The above bounding condition is not the only one possible and is not even the best one for the present purpose. Generally there is more need for a wideband antireflection coating having a minimal reflection over the entire range of wavelengths than for an antireflection coating having zero reflection at one specific wavelength. In order to achieve this it is necessary to depart from condition (4).

In order to make the reflection curve $R = f(\lambda)$, which represents the reflection coefficient R as a function of the wavelength, as flat as possible, $n_{3,m}$ must be changed while $n_s$, $n_{2,m}$ and $n_1$ are maintained constant. This leads to a value $n_{3,f}$. After this, conditions (3) and (1) become:

$$n_1 \times n_{3,f} = c \cdot (n_{2,m} \times \sqrt{n_s}) \tag{5}$$

$$n_1 \times n_{3,f} = d \cdot (n_{2,m})^2 \tag{6}$$

in which c and d are constants.

So far, it has been assumed that $n_s$ and $n_1$ are constants, but this does not mean that the actual values of these refractive indices have no influence on the ultimate value of the reflection coefficient R. If, when using the above method of making the reflection curve $R = f(\lambda)$ as low and as flat as possible, the refractive index $n_s$ is varied while $n_1$ is kept constant, for example $n_1 = 1.38$, the width of the flat part of the reflection curve is found to depend strongly on $n_s$.

Figure 2:
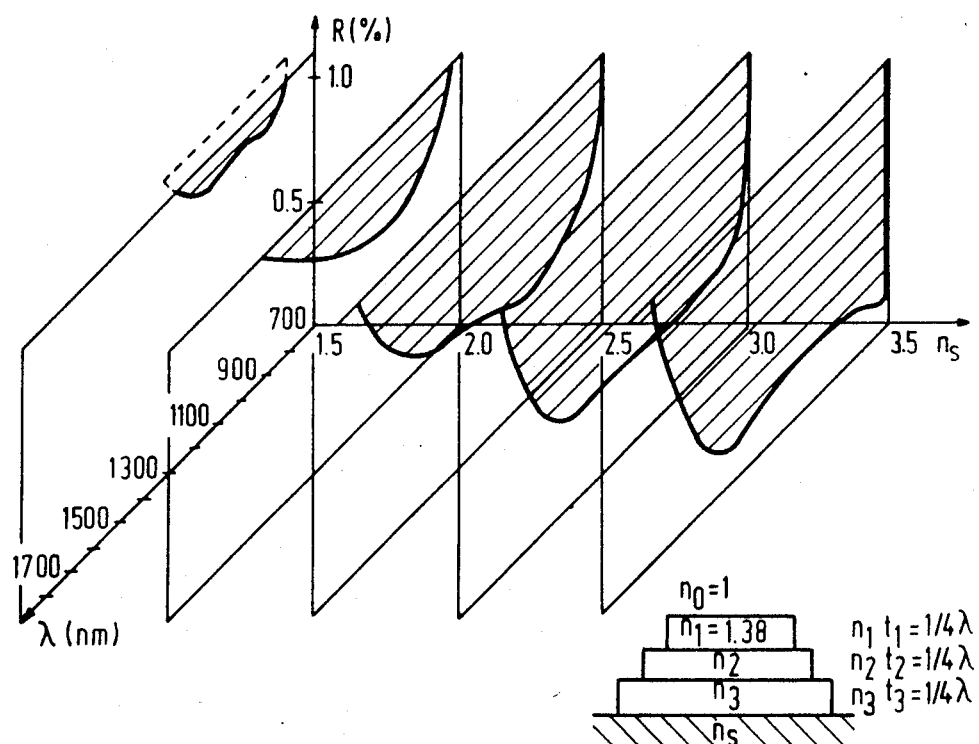
FIG. 2 graphically shows the reflection coefficient as a function of the wavelength for different values of the substrate refractive index, $n_s$, and for a fixed refractive index, $n_1$, of the top layer.

FIG. 2 shows a family of reflection curves for $n_s$-values of 1.5, 2.0, 2.5, 3.0 and 3.5 Surprisingly, this shows that as $n_s$ increases the reflection coefficient R decreases, and the width of the range is wavelengths within which the reflection coefficient remains low increases. FIG. 2 shows clearly that the best result is obtained for $n_s = 3.5$.

Figure 3:
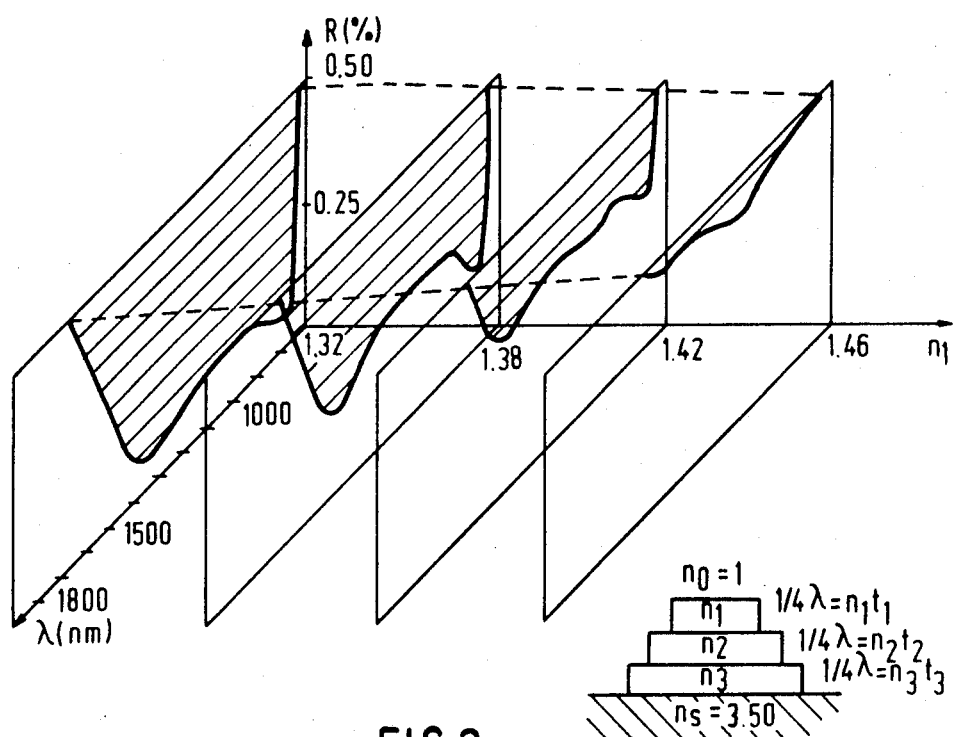
FIG. 3 graphically shows the reflection coefficient as a function of the wavelength for different values of the refractive index, $n_1$, of the top layer, and for a fixed substrate refractive index, $n_s$.

FIG. 3 shows a family of reflection curves for a constant value of the substrate index $n_s = 3.5$ and for different values of the refractive index $n_1$ of the top coating. For the different values of $n_1$ the refractive indices $n_2$ and $n_3$ of the intermediate layers may have the following values:

| | | |
|---|---|---|
| $n_1 = 1.32$ | $n_2 = 2.12$ | $n_3 = 3.10$ |
| $n_1 = 1.38$ | $n_2 = 2.21$ | $n_3 = 3.15$ |

|                |                |                |
| -------------- | -------------- | -------------- |
|                | -continued     |                |
| $n_1 = 1.42$   | $n_2 = 2.27$   | $n_3 = 3.17$   |
| $n_1 = 1.46$   | $n_2 = 2.34$   | $n_3 = 3.20$   |

FIG. 3, surprisingly shows that the reflection curve becomes lower and wider as $n_1$ decreases.

This means that the reflection curves of the conventional antireflection coatings are as low as possible and these low values are obtained for the widest possible range of wavelengths if $n_s$ is as high as possible and $n_1$ is as low as possible.

In practice, it has been found that the refractive index, $n_1$, of the top layer is preferably fixed. Preferably, this layer is made of MgF$_2$ with a refractive index of 1.38. Thus, it is possible to calculate the optimum values of $n_3$ and $n_2$ as a function of $n_s$. The results of these calculations are given in FIG. 4. This shows that optimum antireflection properties for a substrate with a refractive index $n_s = 3.5$ over a wide range of wavelengths can be obtained if the substrate is coated with three layers whose respective refractive indices are:

$n_3 = 3.1$ $n_2 = 2.2$ $n_1 = 1.38$

All of these layers have an optical thickness of $\lambda_o/4$.

The layer with a refractive index $n_3 = 3.1$ is made of AlSb, amorphous Sb$_2$S$_3$, or a mixture of Si and Si$_3$N$_4$. The layer with the refractive index $n_2 = 2.2$ may have one of the following compositions: Nb$_2$O$_5$, TiN, Ta$_2$O$_5$, Sb$_2$O$_3$. The layer with the refractive index $n_1 = 1.38$ may be composed of MgF$_2$.

Figure 4:
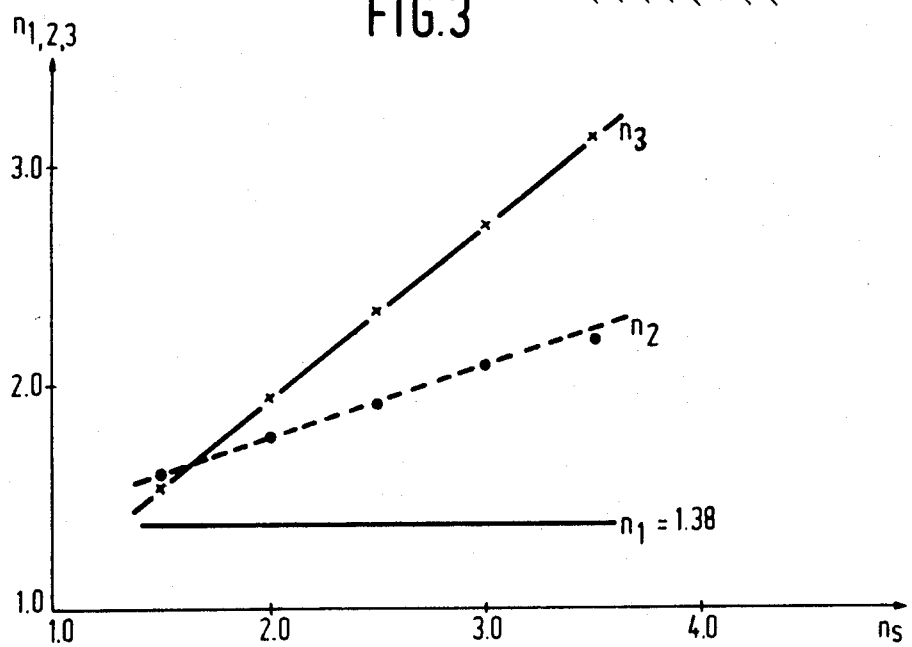
FIG. 4 is a graph showing the relationship between the refractive index, $n_s$, of the substrate and the refractive indices, $n_2$ and $n_3$ of the intermediate layers for an optimum antireflection coating, and for a fixed refractive index $n_1 = 1.38$ of the top layer.

In general, it is possible to say that for a top layer having a refractive index $n_1 = 1.38$ there is a linear relationship between the refractive indices of the layers 2 and 3 and the substrate index, $n_s$. This linear relationship is depicted in FIG. 4.

Glass types intended for use in visible-light optics have refractive indices in the range between approximately 1.45 to approximately 2.0. If the optical components are required to have a comparatively large numerical aperture, such as the optical components in fiber optic telecommunication systems, the types of glass used for this purpose must have comparatively high refractive indices. In order to use the above-mentioned antireflection coating in an optical element with a refractive index between 1.45 and 2.0, a base coating is deposited on the element. According to the invention, the base coating raises the refractive index to the desired value $n_s$ for example $n_s = 3.5$. A complete range of polycrystalline materials are available for the base coating with widely varying refractive indices, for example from 1.30 to 3.00 and even to 4.0 for infrared optics.

Figure 5:
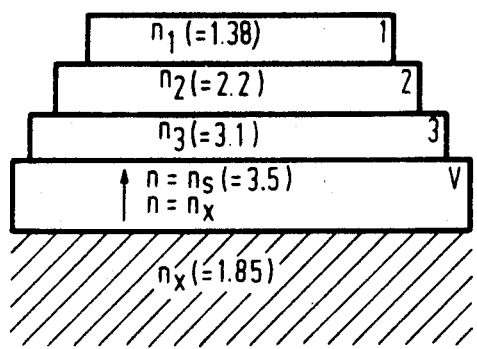
FIG. 5 schematically shows a first embodiment of an antireflection coating according to the invention.

FIG. 5 shows an embodiment of an antireflection coating according to the invention whose base coating comprises a single layer v. The base coating layer is a nonuniform layer whose refractive index, $n_v$, increases continuously from a value $n_x$ at the substrate to a value $n_s$ at the top. The most common value for $n_x$ is 1.85, while $n_1$ is generally 1.38.

As stated above $n_s$ should be as high as possible, in any case higher than 2.5 and preferably about 3.5. The values of $n_2$ and $n_3$ can then be found by means of FIG. 4. The values in parentheses in FIG. 5 are the values of the refractive indices in an example of the present embodiment.

The layers 1, 2 and 3 all have an optical thickness $n \cdot t = \lambda_o/4$, in which t is the geometrical thickness. The thickness of the inhomogeneous layer is not essential.

The varying refractive index in the base coating can be obtained by simultaneous vacuum deposition from two separate sources. The first source must then deliver a material with a refractive index $n_x$ and the second source a material with a refractive index $n_s$.

A single layer with a high refractive index such as the inhomogeneous layer v in FIG. 5 may exhibit an excessive dispersion for some uses. According to the invention, an antireflection coating with a lower dispersion can be obtained if first an inhomogeneous layer having a refractive index which decreases from a value $n_x$ to a low value $n_i$ is deposited on the substrate.

Figure 6:
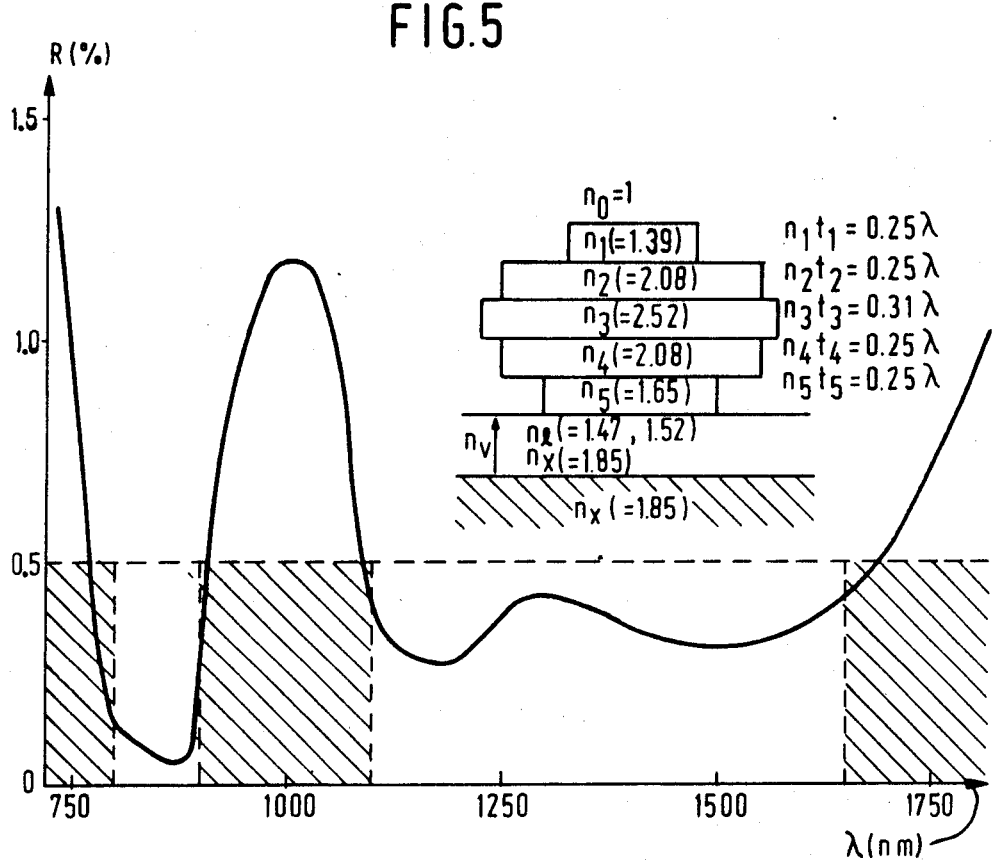
FIG. 6 schematically shows a second embodiment of an antireflection layer according to the invention, and its associated reflection curve.

The effective refractive index of the substrate plus the inhomogeneous layer is subsequently raised by depositing, for example, two layers 5 and 4 on the inhomogeneous layer, as shown in FIG. 6. The layer 4 has a higher refractive index than the layer 5. On the layer 4 a three-layer top coating is deposited. Instead of two homogeneous layers 4 and 5, three or more homogeneous layers with increasing refractive index may be applied to the inhomogeneous layer v before the three-layer top coating is applied.

In FIG. 6, the values of the refractive indices in an example of this embodiment are given in parentheses. The top of the inhomogeneous layer may have a refractive index $n_1 = 1.47$. This refractive index is equal to that of quartz glass. Alternatively, the top of this layer may have a refractive index of 1.52, which corresponds to that of the vacuum-deposition glass "Schott No. 8329". The inhomogeneous layer is again applied by simultaneous vacuum deposition from two sources. In the case of a cold substrate, the first source may contain Yb$_2$O$_3$ with $n_x = 1.83$ and the second source may contain CeF$_3$ with $n_1 = 1.52$ or SiO$_2$ with $n_1 = 1.47$. When the layer is deposited on a hot substrate, the first source may, for example, contain Dy$_2$O$_3$ with $n_x = 1.83$. The second source may contain a B-Na-Al-K vacuum-deposition glass such as "Schott no. 8329" with $n_1 = 1.52$ or quartz glass with $n_1 = 1.47$. The layers 1 to 5 of the coating are made of MgF$_2$, Nb$_2$O$_5$, CdS, Nb$_2$O$_5$, and Al$_2$O$_3$ or MgTiO$_3$ respectively. A hot substrate is a substrate which is heated to a temperature of, for example, 300° C.

By applying the layers 5 and 4 with refractive indices of 1.65 and 2.08, respectively, the assembly comprising the substrate, the inhomogeneous layer and the layers 5 and 4 behaves as a type of glass with an effective refractive index $n_s = 2.5$. This type of glass has a reflection coefficient of approximately 18%. The reflection of this assembly is eliminated by a top coating of three homogeneous layers.

FIG. 6 also shows the variation of the reflection coefficient as a function of the wavelength for the pictured embodiment. It appears that in the wavelength range from 800 nm to 900 nm (in which GaAs-type diode lasers emit radiation) and in the wavelength range from 1100 nm to 1650 nm (in which InP diode lasers emit radiation), the reflection coefficient remains well below 0.5%.

It is to be noted that the layer 3 as an optical thickness of 0.31 $\lambda_o$, and that the layers 1, 2, 4 and 5 have optical thicknesses equal to $\lambda_o/4$. The thickness of the inhomogeneous layer is not critical. The optical thicknesses of the layers need not be exactly $\lambda_o/4$. The reflection curve can be shifted slightly by changing these thicknesses. This allows an optimization if special reflection behavior is required for specific wavelengths.

The invention may be employed for reducing the reflection of optical elements in fiber optic telecommunication systems, but is not limited thereto. The antireflection coatings described here may also be applied to elements of infrared scanning systems.

What is claimed is

1. An antireflection coating on a transparent substrate having an index of refraction, said coating suppressing reflections of wavelengths from approximately 700 nanometers to approximately 1700 nanometers, said antireflection coating comprising:
   a base coating on the substrate, said base coating having a bottom surface against the substrate and having a top surface remote from the substrate, said base coating having a graded refractive index between the top and bottom surfaces, the refractive index of the base coating at the bottom surface being equal to the refractive index of the substrate, the effective refractive index at the top surface of the base coating being at least 2.5; and
   a top coating on the top of the base coating, said top coating having a plurality of homogeneous layers having refractive indices which decrease toward the top of the top coating.

2. An antireflection coating as claimed in claim 1, characterized in that:
   the base coating is a single layer with a refractive index of at least 2.5 at the top surface thereof; and
   the top coating comprises three homogeneous layers, each layer having an optical thickness equal to one-quarter of a reference wavelength.

3. An antireflection coating on a transparent substrate having an index of refraction, said coating suppressing reflections of wavelengths from approximately 700 nanometers to approximately 1700 nanometers, said antireflection coating comprising:
   a base coating on the substrate, said base coating consisting of a single layer having a bottom surface against the substrate and having a top surface remote from the substrate, said base coating having a graded refractive index between the top and bottom surfaces, the refractive index of the base coating at the bottom surface being equal to the refractive index of the substrate, the refractive index at the top surface of the base coating being at least 3.5; and
   a top coating on the top of the base coating, said top coating having a plurality of homogeneous layers having refractive indices which decrease toward the top of the top coating;
   characterized in that the base coating consists essentially of a mixture of Si and $Si_3N_4$.

4. An antireflection coating as claimed in claim 3, characterized in that:
   the top coating comprises first, second, and third homogeneous layers, each layer having an optical thickness approximately equal to one-quarter of a reference wavelength;
   the first layer has a refractive index of 1.38 and consists essentially of $MgF_2$;
   the second layer has a refractive index of 2.2 and consists essentially of one of the materials from the group of $Nb_2O_5$, TiN, $Ta_2O_5$, and $Sb_2O_3$; and
   the third layer has a refractive index of 3.1 and consists essentially of one of the materials from the group of AlSb, amorphous $Sb_2S_3$, and a mixture of Si and $Si_3N_4$.

5. An antireflection coating on a transparent substrate having an index of refraction, said coating suppressing reflections of wavelengths from approximately 700 nanometers to approximately 1700 nanometers, said antireflection coating comprising:
   a base coating on the substrate, said base coating consisting of a single layer having a bottom surface against the substrate and having a top surface remote from the substrate, said base coating having a graded refractive index between the top and bottom surfaces, the refractive index of the base coating at the bottom surface being equal to the refractive index of the substrate, the refractive index at the top surface of the base coating being at least 3.5; and
   a top coating on the top of the base coating, said top coating having a plurality of homogeneous layers having refractive indices which decrease toward the top of the top coating;
   characterized in that the base coating consists essentially of a mixture of Si, $Si_3N_4$, and $SiO_2$.

6. An antireflection coating as claimed in claim 5, characterized in that:
   the top coating comprises first, second, and third homogeneous layers, each layer having an optical thickness approximately equal to one-quarter of a reference wavelength;
   the first layer has a refractive index of 1.38 and consists essentially of $MgF_2$;
   the second layer has a refractive index of 2.2 and consists essentially of one of the materials from the group of $Nb_2O_5$, TiN, $Ta_2O_5$, and $Sb_2O_3$; and
   the third layer has a refractive index of 3.1 and consists essentially of one of the materials from the group of AlSb, amorphous $Sb_2S_3$, and a mixture of Si and $Si_3N_4$.

7. An antireflection coating on a transparent substrate having an index of refraction, said coating suppressing reflections of wavelengths from approximately 700 nanometers to approximately 1700 nanometers, said antireflection coating comprising:
   a base coating on the substrate, said base coating consisting of a single layer having a bottom surface against the substrate and having a top surface remote from the substrate, and base coating having a graded refractive index between the top and bottom surfaces, the refractive index of the base coating at the bottom surface being equal to the refractive index of the substrate, the refractive index at the top surface of the base coating being at least 3.5; and
   a top coating on the top of the base coating, said top coating having a plurality of homogeneous layers having refractive indices which decrease toward the top of the top coating;
   characterized in that the base coating consists essentially of a mixture of GaP and GaN.

8. An antireflection coating as claimed in claim 7, characterized in that:
   the top coating comprises first, second, and third homogeneous layers, each layer having an optical thickness approximately equal to one-quarter of a reference wavelength;

the first layer has a refractive index of 1.38 and consists essentially of $MgF_2$;

the second layer has a refractive index of 2.2 and consists essentially of one of the materials from the group of $Nb_2O_5$, TiN, $Ta_2O_5$, and $Sb_2O_3$; and the third layer has a refractive index of 3.1 and consists essentially of one of the materials from the group of AlSb, amorphous $Sb_2S_3$, and a mixture of Si and $Si_3N_4$.

9. An antireflection coating on a transparent substrate having an index of refraction, said coating suppressing reflections of wavelengths from approximately 700 nanometers to approximately 1700 nanometers, said antireflection coating comprising:

a base coating on the substrate, said base coating consisting of a single layer having a bottom surface against the substrate and having a top surface remote from the substrate, said base coating having a graded refractive index between the top and bottom surfaces, the refractive index of the base coating at the bottom surface being equal to the refractive index of the substrate, the refractive index at the top surface of the base coating being at least 3.5; and a top coating on the top of the base coating, said top coating having a plurality of homogeneous layers having refractive indices which decrease toward the top of the top coating;

characterized in that the base coating consists essentially of a mixture of GaP, GaN, and $Ga_2O_3$.

10. An antireflection coating as claimed in claim 9, characterized in that the top coating comprises first, second, and third homogeneous layers, each layer having an optical thickness approximately equal to one-quarter of a reference wavelength;

the first layer has a refractive index of 1.38 and consists essentially of $MgF_2$;

the second layer has a refractive index of 2.2 and consists essentially of one of the materials from the group of $Nb_2O_5$, TiN, $Ta_2O_5$, and $Sb_2O_3$; and the third layer has a refractive index of 3.1 and consists essentially of one of the materials from the group of AlSb, amorphous $Sb_2S_3$, and a mixture of Si and $Si_3N_4$.

11. An antireflection coating on a transparent substrate having an index of refraction, said coating suppressing reflections of wavelengths from approximately 700 nanometers to approximately 1700 nanometers, said antireflection coating comprising:

a base coating on the substrate, said base coating consisting of a single layer having a bottom surface against the substrate and having a top surface remote from the substrate, said base coating having a graded refractive index between the top and bottom surfaces, the refractive index of the base coating at the bottom surface being equal to the refractive index of the substrate, the refractive index at the top surface of the base coating being at least 3.5; and a top coating on the top of the base coating, said top coating having a plurality of homogeneous layers having refractive indices which decrease toward the top of the top coating;

characterized in that the base coating consists essentially of a mixture of PbS and ZnS.

12. An antireflection coating as claimed in claim 11, characterized in that:

the top coating comprises first, second, and third homogeneous layers, each layer having an optical thickness approximately equal to one-quarter of a reference wavelength;

the first layer has a refractive index of 1.38 and consists essentially of $MgF_2$;

the second layer has a refractive index of 2.2 and consists essentially of one of the materials from the group of $Nb_2O_5$, TiN, $Ta_2O_5$, and $Sb_2O_3$; and the third layer has a refractive index of 3.1 and consists essentially of one of the materials from the group of AlSb, amorphous $Sb_2S_3$, and a mixture of Si and $Si_3N_4$.

13. An antireflection coating on a transparent substrate having an index of refraction, said coating suppressing reflections of wavelengths from approximately 700 nanometers to approximately 1700 nanometers, said antireflection coating comprising:

a base coating on the substrate, said base coating consisting of a single layer having a bottom surface against the substrate and having a top surface remote from the substrate, said base coating having a graded refractive index between the top and bottom surfaces, the refractive index of the base coating at the bottom surface being equal to the refractive index of the substrate, the refractive index at the top surface of the base coating being at least 3.5; and a top coating on the top of the base coating, said top coating having a plurality of homogeneous layers having refractive indices which decrease toward the top of the top coating;

characterized in that the base coating consists essentially of a mixture of PbS, ZnS, and a B-Na-Al-K glass.

14. An antireflection coating as claimed in claim 13, characterized in that:

the top coating comprises first, second, and third homogeneous layers, each layer having an optical thickness approximately equal to one-quarter of a reference wavelength;

the first layer has a refractive index of 1.38 and consists essentially of $MgF_2$;

the second layer has a refractive index of 2.2 and consists essentially of one of the materials from the group of $Nb_2O_5$, TiN, $Ta_2O_5$, and $Sb_2O_3$; and the third layer has a refractive index of 3.1 and consists essentially of one of the materials from the group of AlSb, amorphous $Sb_2S_3$, and a mixture of Si and $Si_3N_4$.

15. An antireflection coating on a transparent substrate having an index of refraction, said coating suppressing reflections of wavelengths from approximately 700 nanometers to approximately 1700 nanometers, said antireflection coating comprising:

a base coating on the substrate, said base coating having a bottom surface against the substrate and having a top surface remote from the substrate; and a top coating on the top of the base coating, said top coating having first, second, and third homogeneous layers having refractive indices which decrease toward the top of the top coating, each layer having an optical thickness approximately equal to one-quarter of a reference wavelength;

characterized in that the base coating comprises:

a first inhomogeneous layer on the substrate, said layer having a graded refractive index which decreases from the bottom surface to the top surface, the refractive index of the base coating at the bottom surface being equal to the refractive index of the substrate; and at least first and second homogeneous layers on the inhomogeneous layer, said layers having refractive indices which increase toward the top of the base coating;

wherein the effective refractive index at the top of the base coating is at least 2.5.

16. An antireflection coating as claimed in claim 15, characterized in that in sequence from the top to the bottom of the antireflection coating:

the first layer of the top coating has a refractive index of 1.39, has an optical thickness equal to one-quarter of the reference wavelength, and consists essentially of $MgF_2$;

the second layer of the top coating has a refractive index of 2.08, has an optical thickness equal to one-quarter of the reference wavelength, and consists essentially of $Nb_2O_5$;

the third layer of the top coating has a refractive index of 2.52, has an optical thickness equal to 0.31 times the reference wavelength, and consists essentially of CdS;

the first homogeneous layer of the base coating has a refractive index of 2.08, has an optical thickness equal to one-quarter of the reference wavelength, and consists essentially of $Nb_2O_5$; and the second homogeneous layer of the base coating has a refractive index of 1.65, has an optical thickness equal to one-quarter of the reference wavelength, and consists essentially of $Al_2O_3$.

* * * * *